United States Patent
Ok et al.

(10) Patent No.: US 7,532,590 B2
(45) Date of Patent: May 12, 2009

(54) CELL SEARCH APPARATUS AND METHOD IN A MOBILE COMMUNICATION SYSTEM

(75) Inventors: Kwang-Man Ok, Songnam-shi (KR); Joo-Kwang Kim, Yongin-shi (KR); Chae-Man Lim, Seoul (KR); Seong-Ho Hur, Songnam-shi (KR); Dong-Ryeol Ryu, Seoul (KR)

(73) Assignee: Samsung Electronics Co., Ltd (KR)

( * ) Notice: Subject to any disclaimer, the term of this patent is extended or adjusted under 35 U.S.C. 154(b) by 1008 days.

(21) Appl. No.: 10/281,767

(22) Filed: Oct. 28, 2002

(65) Prior Publication Data

US 2003/0095516 A1    May 22, 2003

(30) Foreign Application Priority Data

Oct. 26, 2001  (KR) .............................. 2001-66467

(51) Int. Cl.
   *H04B 7/00*  (2006.01)
(52) U.S. Cl. ....................................................... 370/310
(58) Field of Classification Search ................. 370/310, 370/312, 328, 329, 331, 335–342
   See application file for complete search history.

(56) References Cited

U.S. PATENT DOCUMENTS

| | | | | |
|---|---|---|---|---|
| 6,188,682 B1* | 2/2001 | Takagi et al. | ................ | 370/342 |
| 6,289,007 B1* | 9/2001 | Kim et al. | ................... | 370/331 |
| 6,490,315 B2* | 12/2002 | Katz et al. | .................. | 375/149 |
| 6,822,999 B1* | 11/2004 | Lee et al. | ..................... | 375/145 |
| 7,031,277 B2* | 4/2006 | Choi et al. | .................. | 370/331 |
| 7,072,318 B2* | 7/2006 | Shoji et al. | .................. | 370/335 |
| 2002/0041579 A1* | 4/2002 | Tanno et al. | ................ | 370/335 |
| 2002/0048315 A1* | 4/2002 | Hanada et al. | ............... | 375/145 |

OTHER PUBLICATIONS

3G TS 25.201 V3.1.0(Jun. 2000); 3rd Generation Partnership Project; Technical Specification Group Radio Access Network; Spreading and modulation (FDD) (Release 1999); (14 pgs).

3GPP TS 25.213 V3.6.0 (Jun. 2001); 3rd Generation Partnership Project; Technical Specification Group Radio Access Network; Spreading and modulation (FDD) (Release 1999); (6 pgs.).

* cited by examiner

*Primary Examiner*—Dmitry Levitan
(74) *Attorney, Agent, or Firm*—The Farrell Law Firm, PC (57) ABSTRACT

A cell search apparatus and method in a mobile communication system. After a UE acquires slot boundary timing and frame boundary timing to a Node B, it acquires its scrambling code number and scrambling code timing. After the initial cell search, the UE performs multi-path search by searching a first area with respect to the scrambling code timing. During reacquisition in a sleep state, the UE searches a second area wider than the first area with respect to a scrambling code timing acquired before the sleep state. The UE performs neighbor cell search by selectively using the initial cell search and the multi-path search according to whether the Node B provides information or what information it provides.

12 Claims, 9 Drawing Sheets

| Scrambling Code Group | slot number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 1 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 2 | 15 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |

FIG.6A

| | | | | | | | | | | | | | | |
|---|---|---|---|---|---|---|---|---|---|---|---|---|---|---|
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 10 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

CELL SEARCH APPARATUS AND METHOD IN A MOBILE COMMUNICATION SYSTEM

PRIORITY

This application claims priority to an application entitled "Cell Search Apparatus and Method in a Mobile Communication System" filed in the Korean Industrial Property Office on Oct. 26, 2001 and assigned Serial No. 2001-66467, (Publication No. 2003-34746 published on May 9, 2003), the contents of which are hereby incorporated by reference.

BACKGROUND OF THE INVENTION

1. Field of the Invention

The present invention relates generally to a mobile communication system, and in particular, to a cell search apparatus and method for a UE (User Equipment) in an asynchronous CDMA (Code Division Multiple Access) mobile communication system.

2. Description of the Related Art

In a CDMA mobile communication system, particularly IS-95, an MS (Mobile Station) acquires PN (Pseudo Noise) code timing upon power-on (initial cell search). Then the MS detects multi-path signal components for rake demodulation with the PN code timing maintained (multi-path search), and searches for a neighbor cell to which the MS is to be handed off (neighbor cell search). If a slotted mode is set in an idle state, when the MS wakes up from sleep, it re-acquires PN code timing lost in the sleep state (reacquisition). A searcher takes charge of the initial cell search, multi-path search, neighbor cell search and reacquisition.

The initial cell search, multi-path search, neighbor cell search, and reacquisition will be described in more detail.

The searcher of the MS in the IS-95 CDMA mobile communication system uses a forward pilot channel to acquire synchronization, that is, the PN code timing. The forward pilot channel has only a scrambled PN code while data is unmodulated, as transmitted from a base station (BS) to all MSs within the cell area of the BS to allow the MSs to acquire the PN code timing. Since all BSs in the IS-95 system are synchronized with one another by GPS (Global Positioning System) satellites, they are identified by their own PN offsets.

Therefore, the MS acquires the PN code timing of the BS on the forward pilot channel upon power-on and thus acquires synchronization to the BS. This is the initial cell search. The multi-path search is a process of searching a predetermined area around the PN code timing, a window and thus detecting a variation in the PN code timing and the multi-path components of a received signal.

To determine whether a handoff is required, the MS measures the signal strengths of forward pilot channels from neighbor cells using information about the PN code timings of the neighbor cells received from the BS, which is the neighbor cell search. Finally, if the MS operates in a slotted mode to increase a waiting time in an idle state, the PN code timing lost in a sleep state is reacquired by searching the window when it wakes up from sleep. This is the reacquisition.

The MS performs the initial cell search, multi-path search, neighbor cell search, and reacquisition using the forward pilot channels. The operations are similar. Hence a single searcher takes charge of them. That is, the searcher functions correspondingly for each of the operations.

IS-95 has been evolved to the future generation communication system. A future generation communication system, UMTS (Universal Mobile Telecommunication System) is an asynchronous CDMA system in which Node Bs are not synchronized to one another. In UMTS, a UE performs initial cell search, multi-path search, neighbor cell search, and reacquisition like an MS in IS-95.

Although IS-95 and UMTS commonly adopt CDMA, they differ in synchronization. Therefore, they operate differently for initial cell search, multi-path search, neighbor cell search, and reacquisition.

A cell specific code is assigned to each Node B to identify it in UMTS. Assuming 512 cells exist in UMTS and one Node B is in each cell, the 512 Node Bs are identified by their cell specific codes.

To search for a covering Node B, the UE must search the 512 Node Bs by checking the phases of their cell specific codes. Thus, a long time is taken for the cell search. Accordingly, a multi-step cell search algorithm is employed in UMTS because of inefficiency of a general cell search algorithm for the cell search. To implement the multi-step cell search algorithm, the Node Bs in the UMTS system, for example, the 512 Node Bs are classified into 64 groups Group 0 to Group 63 each having 8 Node Bs and a different group specific code assigned to it. Each of the Node Bs in each group uses a different scrambling code for CPICH (Common Pilot Channel). Therefore, the UE can search for a covering Node B by its scrambling code.

The multi-step cell search includes the following three cell search steps. Cell search step 1: the UE receives a P-SCH (Primary Synchronization Channel) signal from a Node B and acquires the timing of a slot having the highest power. Cell search 2: the UE acquires frame synchronization and detects a Node B group to which it belongs from an S-SCH (Secondary Synchronization Channel) signal received from the Node B using the slot timing information. Cell search 3: the UE performs an exhaustive search for the covering Node B by a CPICH signal from the Node B using the frame synchronization and Node B group information.

The above three-step cell search algorithm has been designed for the initial cell search in UMTS. Aside from the initial cell search, however, a searcher of the UE must perform multi-path search, neighbor cell search, and reacquisition. A searcher configured to operate by the three-step cell search is good at the initial cell search but limited in performing multi-path search, neighbor cell search and reacquisition. The limitations of the searcher employing the three-step cell search structure in multi-path search, neighbor cell search, and reacquisition are as follows.

(1) A scrambling code timing window needs to be searched at a high rate of tens of Hertzes to adaptively cope with a rapid channel environmental change in the multi-path search. However, the three-step cell search is not suitable for such rapid search.

(2) Information about the scrambling code numbers or scrambling code timing of neighbor cells can be provided from a Node B in the neighbor cell search. If the Node B provides no information, the three-step cell search can be employed. On the other hand, if the Node B provides either or both of the scrambling code number information and the scrambling code timing information, another search method may have better performance in the neighbor cell search.

(3) To increase the waiting time of the UE, scrambling code timing must be acquired as fast as possible in the reacquisition. Yet, the three-step cell search method is not suitable for the rapid scrambling code timing acquisition. When an off-line reacquisition is required to further increase the waiting time, cell search 1 and cell search 2 in the three-step cell search method are not available for off-line search.

Besides, a so-called "timing reference" problem may be generated. If the UE is provided with four searchers for cell search 1, cell search 2, cell search 3, and the multi-path search, neighbor cell search, and reacquisition, timing reference is required for search transition with reliable timing transition.

SUMMARY OF THE INVENTION

An aspect of the present invention is, therefore, to provide a cell search apparatus and method in a mobile communication system.

Another aspect of the present invention is to provide a cell search apparatus and method for performing multi-path search at high speed in a mobile communication system.

Yet another aspect of the present invention is to provide a cell search apparatus and method for performing neighbor cell search adaptively according to information received from a Node B in a mobile communication system.

Still another aspect of the present invention is to provide a cell search apparatus and method for performing reacquisition in the shortest time to increase a waiting time in a mobile communication system.

Yet another aspect of the present invention is to provide a cell search apparatus and method for providing reference timing for state transition when performing initial cell search, multi-path search, neighbor cell search, and reacquisition in a mobile communication system.

Accordingly, in a cell search apparatus, a first-step cell searcher receives a P-SCH signal and acquires slot boundary timing to a Node B from the P-SCH signal. A second-step cell searcher receives an S-SCH signal in synchronization to the slot boundary timing, acquires frame boundary timing to the Node B from the S-SCH signal, and detects a scrambling code group to which the Node B belongs. A third-step cell searcher receives a CPICH signal in synchronization to the frame boundary timing, and acquires a scrambling (Pseudo Noise) code timing by detecting the scrambling code of the Node B. A multi-path searcher correlates the CPICH signal in a predetermined area with respect to the scrambling code timing with the scrambling code and detects multi-path signals having peak correlation energies equal to or higher than a first threshold. A timing controller generates the indexes of the slot boundary timing and the frame boundary timing and provides the indexes as a timing reference to the searchers when a state transition occurs.

In a cell search method, a P-SCH signal is received and slot boundary timing to a Node B is acquired from the P-SCH signal in a first cell search step. An S-SCH signal is received in synchronization to the slot boundary timing, frame boundary timing to the Node B is acquired from the S-SCH signal and a scrambling code group to which the Node B belongs is detected in a second cell search step. In a third cell search step, a CPICH signal is received in synchronization to the frame boundary timing, and a scrambling code timing is acquired by detecting the scrambling code of the Node B. In a multi-path search step, the CPICH signal in a predetermined first area with respect to the scrambling code timing is correlated with the scrambling code upon receipt of the index of the scrambling code timing for multi-path search from a timing controller under a predetermined control after the initial cell search of the first, second and third cell search steps is completed, and multi-path signals having peak correlation energies equal to or higher than a first threshold are detected. In a reacquisition step, the CPICH signal in a second area wider than the first area is correlated with the scrambling code upon receipt of the index of the scrambling code timing for reac- quisition from the timing controller under the predetermined control after the initial cell search is completed, and the scrambling code timing is reacquired if the highest correlation energy is equal to or higher than the first threshold.

BRIEF DESCRIPTION OF THE DRAWINGS

The above and other objects, features and advantages of the present invention will become more apparent from the following detailed description when taken in conjunction with the accompanying drawings in which:

FIGS. 6A and 6B are secondary sync code assignment tables in the typical UMTS system;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
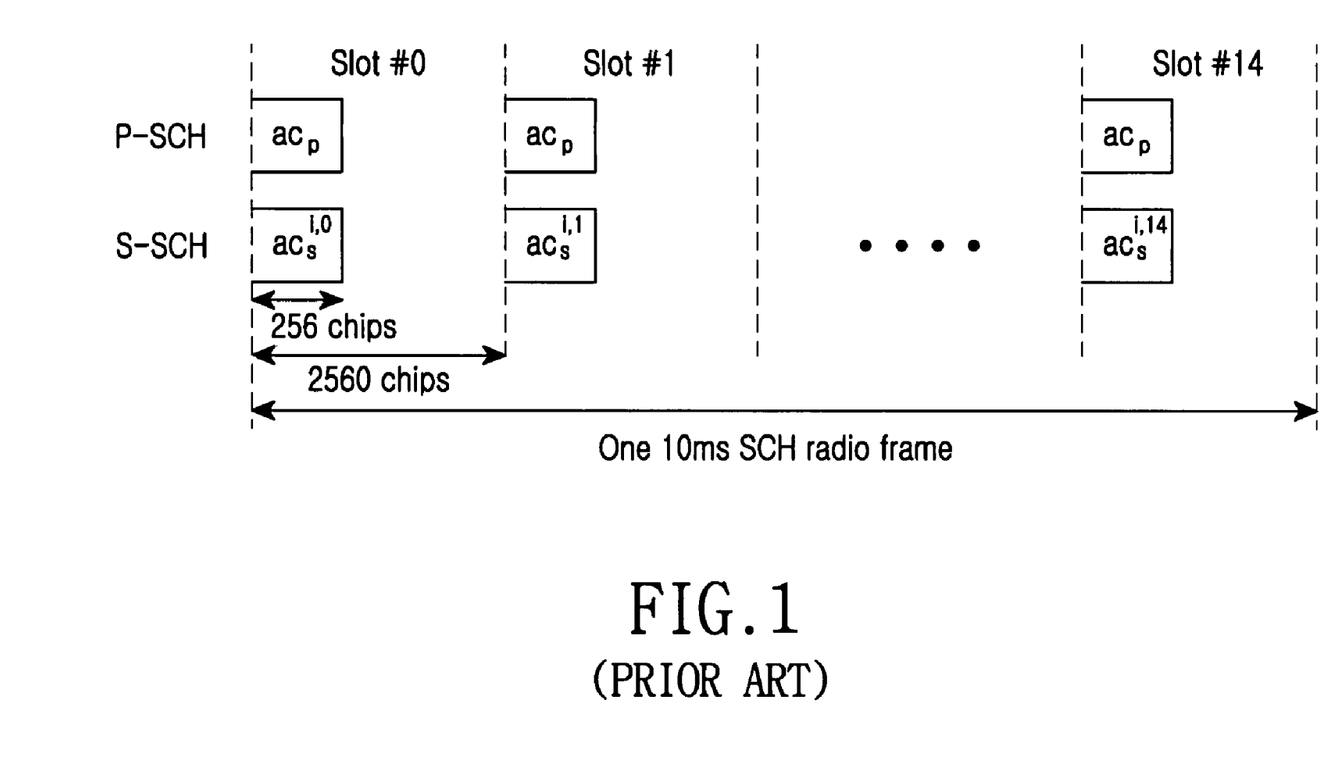
FIG. 1 illustrates a synchronization channel structure in a typical UMTS system.

Referring to FIG. 1, the structure of the SCH is depicted along the time axis. Searchers in a UE use the SCH and the CPICH to acquire synchronization in UMTS. The SCH is a downlink channel used for cell search. The SCH consists of two sub-channels, the P-SCH and S-SCH. Each SCH slot has 2560 chips and 15 slots form one radio frame having 38400 chips in total.

The P-SCH is the same for every Node B. The P-SCH carries a PSC (Primary Synchronization Code) $C_p$ for a tenth of the slot duration, i.e., 256 chips. The UE synchronizes to the slot time of a Node B using the P-SCH.

The Node B transmits the S-SCH in parallel with the P-SCH. The S-SCH repeatedly transmits a 15-symbol sequence of modulated codes of length 256 chips, the SSCs (Secondary Synchronization Codes). The SSC is denoted $C_s^{i,k}$, where i=1, 2, . . . , 64 is the number of the Node B group (scrambling code group) and k=0, 1, . . . , 14 is the slot number. Each SSC is chosen from a set of 16 different codes of length 256 chips. This sequence on the S-SCH indicates to which of the code groups the downlink scrambling code belongs. The UE detects the scrambling code group of the Node B to which the UE belongs and acquires frame synchronization.

Referring to FIG. 1, the P-SCH and the S-SCH are modulated with a symbol a. If a is 1, this implies that the P-CCPCH (Primary Common Control Physical Channel) of the Node B is STTD (Space Time block coding based Transmit Diversity)-encoded. If a is −1, this implies that the P-CCPCH is not STTD-encoded.

Now a description of a modulation pattern of the CPICH will be given below with reference to FIG. 2.

Figure 2:
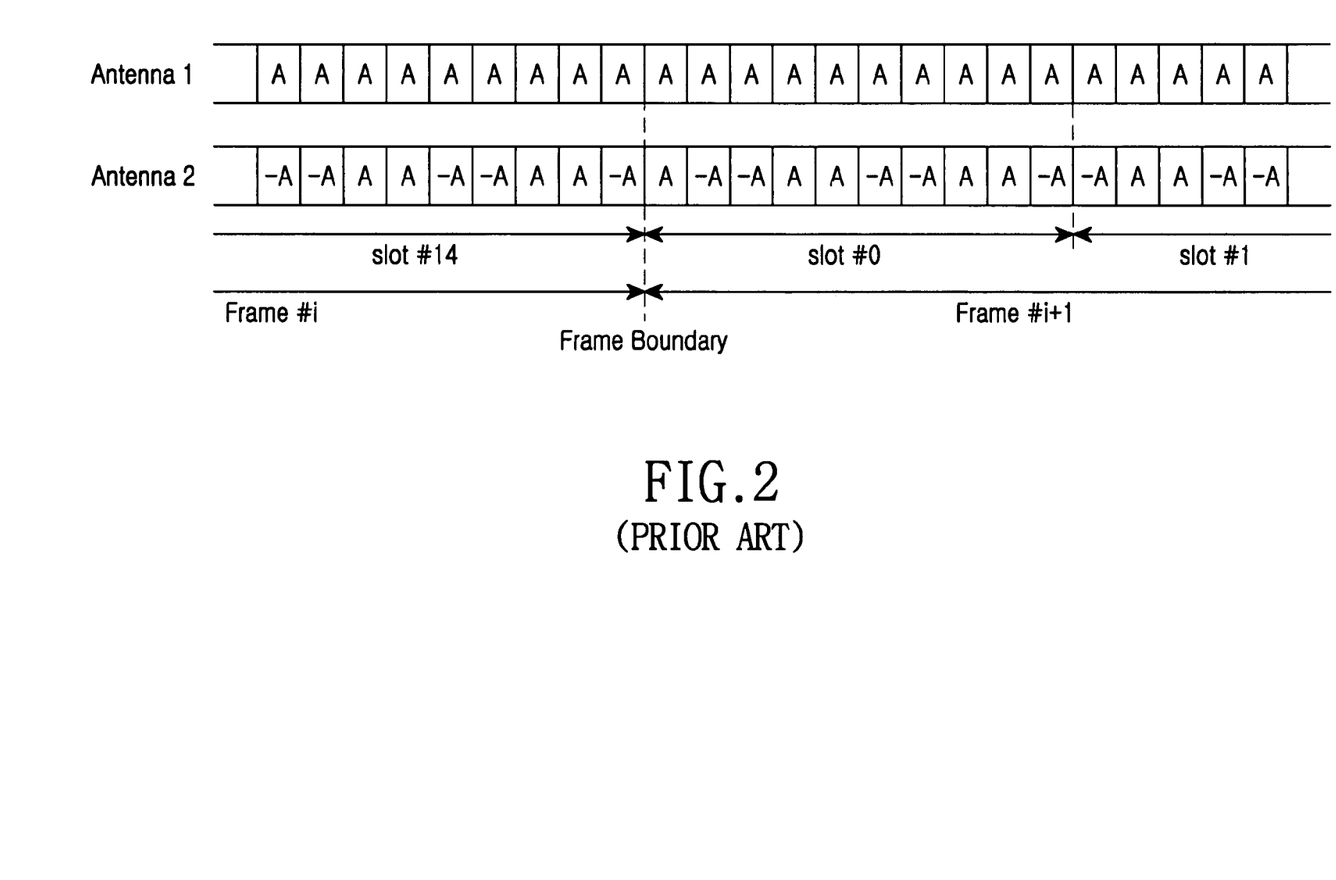
FIG. 2 illustrates a modulation pattern of a CPICH in the typical UMTS system.

FIG. 2 illustrates an example of a modulation pattern of the CPICH in the typical UMTS system. Referring to FIG. 2, the CPICH is a fixed-rate (30 kbps) downlink physical channel that carries a predefined symbol sequence. When transmit diversity is applied to downlink channels in a Node B, its CPICHs are transmitted with the same channelization code and scrambling code through two antennas, antenna 1 and antenna 2. In this case, different symbol sequences are applied to the CPICHs as illustrated in FIG. 2. On the other hand, if transmit diversity is not used on the downlink channels, the Node B uses a symbol sequence for antenna 1 on the CPICH.

There are two types of CPICHs, the P-CPICH (Primary Common Pilot Channel) and S-CPIC (Secondary Pilot Channel). The P-CPICH uses the same channelization code #0 and scrambled by a scrambling code #0. There is one P-SPICH per cell and thus the P-SPICH is broadcast over the entire cell. The S-CPICH is spread with an arbitrary channelization code and scrambled with the PSC and the SSC. There are zero, one, or several SSCs per cell. Thus, the S-CPICH may be transmitted over only a part of the cell. Hence the CPICH is the phase reference for the downlink DPCH and used for cell search.

As described before, searchers of a UE in UMTS must perform initial cell search, multi-path search, neighbor cell search and reacquisition, which will briefly be descried according to the present invention.

Initial Cell Search: the three-step cell search is adopted for initial cell search according to an embodiment of the present invention. During initial acquisition, a PSC generated in the UE is correlated with hypotheses at predetermined intervals, for example, every ½ chips in a slot in the first cell search step. If the highest correlation is equal to or higher than a threshold, the UE acquires slot timing to a Node B and transitions to the second cell search step with the detected slot boundary timing. If the highest correlation is below the threshold, the first cell search step is repeated.

In the second cell search step, signals received at the slot boundary timing acquired in the first cell search step are correlated with 16 SSCs generated in the UE and then correlated with 64 code groups and 15 frame boundary hypotheses. If the highest correlation is equal to or higher than a threshold, the UE transitions to the third cell search step with the detected code group and frame boundary timing. If the highest correlation is below the threshold, the first cell search step is repeated.

In the third cell search step, 8 scrambling codes in the code group found in the second cell search step are correlated with a received signal. If the highest correlation is equal to or higher than a threshold, the UE determines that the final cell search is successful. If the highest correlation is below the threshold, the first cell search step is repeated.

Neighbor cell search: neighbor cells are searched depending on whether a covering Node B provides information about the scrambling code numbers and scrambling code timing of the neighbor cells. According to the embodiment of the present invention, one of three-step initial cell search, two-step initial cell search, and multi-path search is selected as long as the selected method ensures the shortest time with the same search performance under the same channel environment adaptively depending on whether the neighbor cell information is provided and which information is provided.

(1) In the case where no neighbor cell information is provided.

The UE adopts the three-step cell search used for initial acquisition. In the first cell search step, hypotheses at predetermined intervals in a slot are correlated with a PSC generated in the UE. The UE transitions to the second cell search step with a plurality of correlations equal to or higher than a threshold, in relation to corresponding slot boundary timings. If all correlations are below the threshold, the first cell search step is repeated. In the second cell search step, signals with each slot boundary timing found in the first cell search step is correlated with 16 SSCs and then correlated with 64 code groups and 15 frame boundary hypotheses. The UE transitions to the third cell search step with a plurality of correlations equal to or higher than a threshold in relation to corresponding code groups and frame boundary timings. If all correlations are below the threshold, the first cell search step is repeated. In the third cell search step, signals from Node Bs in each code group found in the second cell search step are correlated with 8 scrambling codes. If the sum of correlations equal to or higher than a first threshold in the same neighbor cell is equal to or higher than a second threshold, the UE determines that a handoff to the neighbor cell is likely to occur. Otherwise, the UE determines that there is no possibility of a handoff to the neighbor cell.

(2) In the case where only information about the scrambling code numbers of neighbor cells is provided.

Either of the three-step cell search and the two-step cell search is selected as long as the selected method searches in the shortest time with the same search performance under the same channel environment. In the former method, hypotheses at predetermined intervals in a slot are correlated with a PSC generated in the UIE. The UE transitions to the third cell search step with a plurality of correlations equal to or higher than a threshold, in relation to corresponding slot boundary timings. If all correlations are below the threshold, the first cell search step is repeated. In the third cell search step, a signal with each slot boundary timing found in the first cell search step is correlated with 15 frame boundary hypotheses and all possible cases of the scrambling code numbers of the neighbor cells. If the sum of correlations equal to or higher than a first threshold in the same neighbor cell is equal to or higher than a second threshold, the UE determines that a handoff to the corresponding neighbor cell is possible. Otherwise, the UE determines that there is no possibility of a handoff to the neighbor cell.

(3) In the case where information about the scrambling code numbers and scrambling code timing of neighbor cells is provided.

One of the three-step cell search, the two-step cell search and the multi-path search is selected as long as the selected method searches in the shortest time with the same search performance under the same channel environment. In the multi-path search, hypotheses at predetermined intervals in a scrambling code timing window are correlated. If the sum of highest correlations equal to or higher than a first threshold is equal to or higher than a second threshold, the UE determines that a handoff can occur to a corresponding neighbor cell, and otherwise, the UE determines that there is no possibility of a handoff to the neighbor cell.

Multi-path search: high-speed search is required to actively cope with a rapid channel environmental change. Hypotheses at predetermined intervals in a scrambling code timing window are correlated. A plurality of peak correlations equal to or higher than a first threshold are detected. Then the scrambling code timings corresponding to the detected correlations are the timings of multi-path signal components.

Reacquisition: reacquisition also requires high-speed, off-line search to increase the waiting time of a UE. Thus, the multi-path search is used. Hypotheses at predetermined intervals in a window of a scrambling code timing just before the UE enters a sleep state are correlated. A plurality of peak correlations equal to or higher than a first threshold are detected. Then, a scrambling code timing corresponding to the highest correlation is reacquired.

Hereinbelow, a description with reference to FIG. 3. will be made of a cell search apparatus for performing initial cell search, neighbor cell search, multi-path search, and reacquisition according to an embodiment of the present invention.

Figure 3:
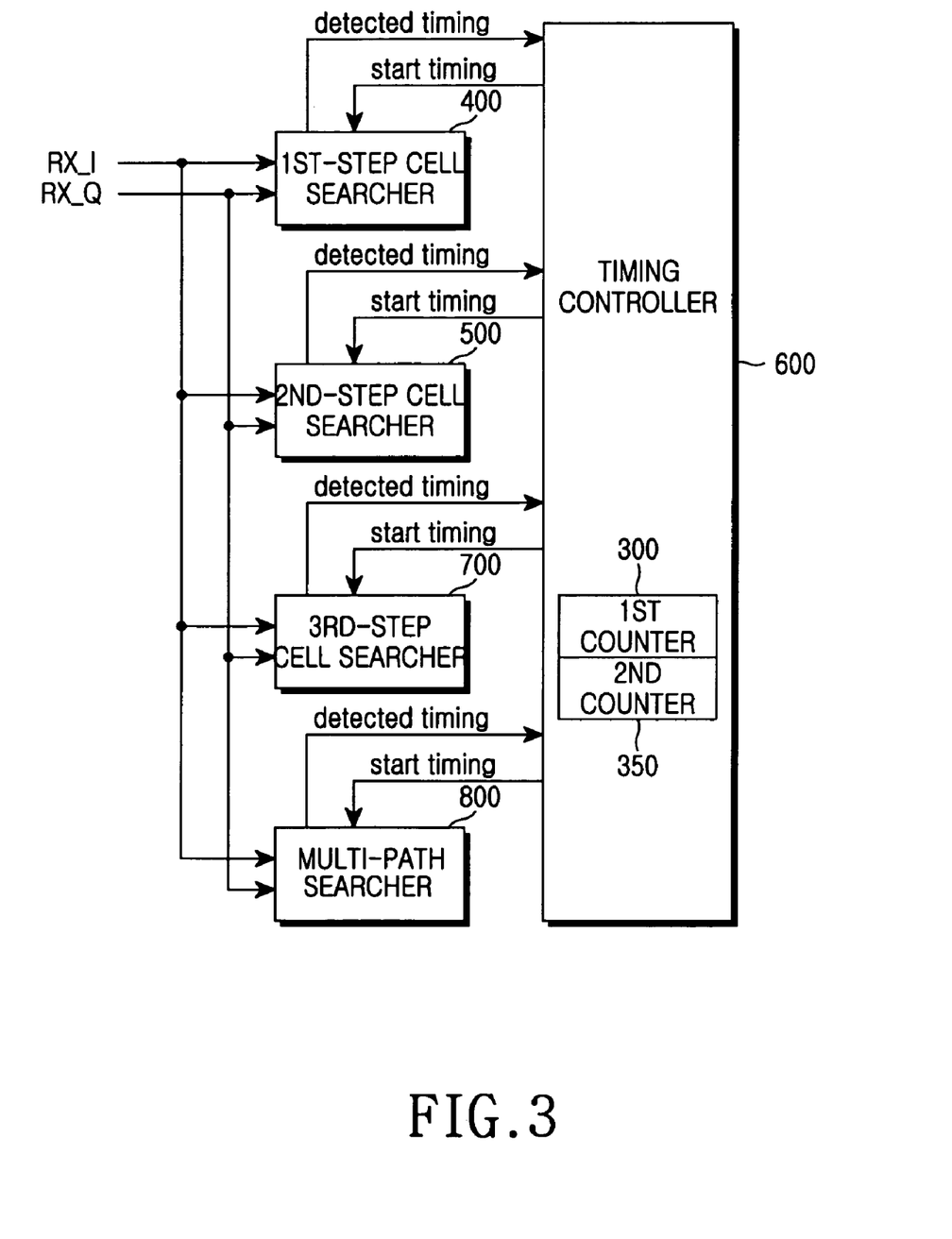
FIG. 3 is a block diagram of a cell search apparatus in a UE according to an embodiment of the present invention.

Referring to FIG. 3, the cell search apparatus is comprised of a first-step cell searcher 400, a second-step cell searcher 500, a third-step cell searcher 700, a multi-path searcher 800, and a timing controller 600 to support initial cell search, neighbor cell search, multi-path search, and reacquisition.

Since a UE performs neighbor cell search by the two- or three-step cell search after initial acquisition through the three-step cell search, the first-step cell searcher 400, the second-step cell searcher 500, and the third-step cell searcher 700 suffice for both the initial cell search and the neighbor cell search. The multi-path searcher 800 supports neighbor cell search, multi-path search and reacquisition. The timing controller 600 includes a first counter 300 and a second counter 350 to provide a timing reference to support reliable search timing transition between the searchers 400, 500, 700, 800 and to support reliable search timing transition between the timing controller 600 and the searchers 400, 500, 700, 800. The first counter 300 counts chips to acquire slot boundary timing, and the second counter 350 counts slots to acquire frame boundary timing.

Figure 4:
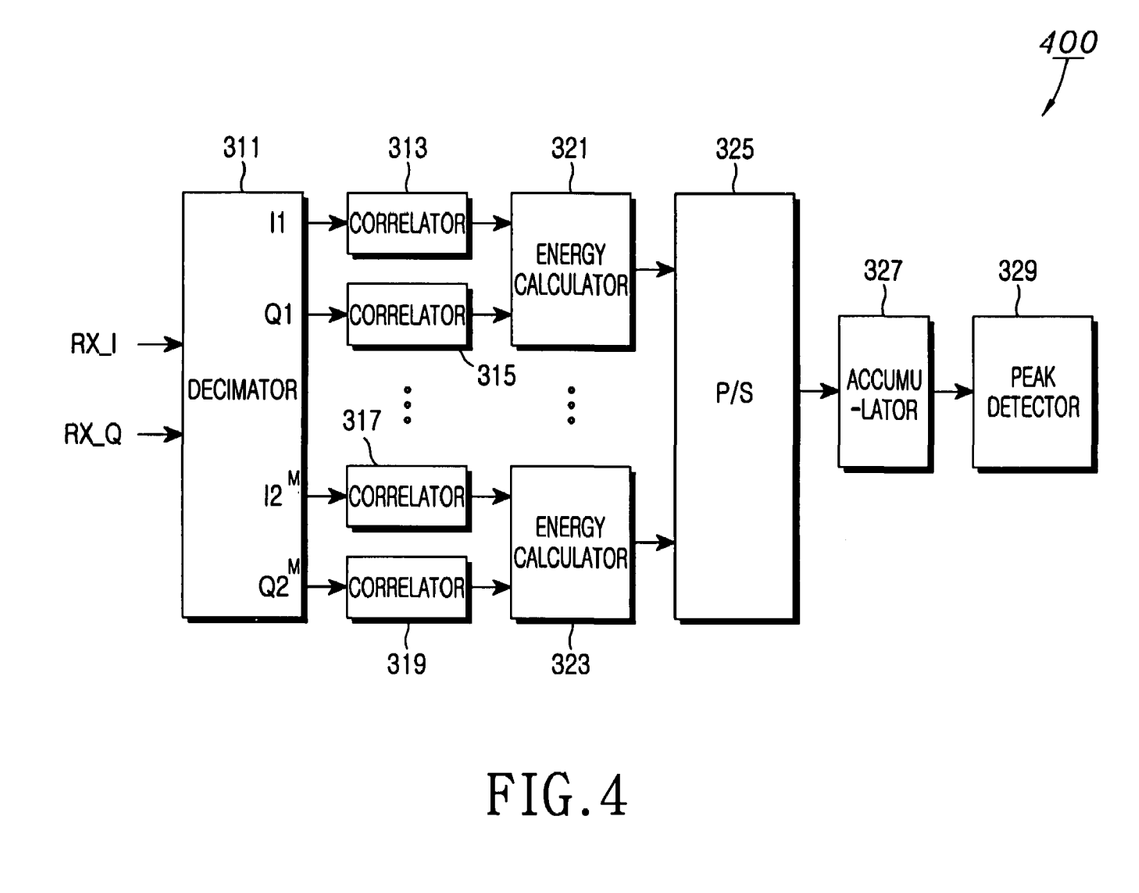
FIG. 4 is a block diagram of a first-step cell searcher illustrated in FIG. 3.

FIG. 4 is a block diagram of the first-step cell searcher 400 illustrated in FIG. 3. The first-step cell searcher 400 correlates a PSC generated in the UE with hypotheses at predetermined intervals, for example, every ½ chips in a slot of a received P-SCH signal. It detects the slot boundary timings of hypotheses having peak correlations equal to or higher than a predetermined threshold. In the case of initial acquisition, only the slot boundary timing of a hypothesis having the highest correlation is used in the second-step cell searcher. On the other hand, in the case of neighbor cell search, the detected slot boundary timings are used in the second-step cell searcher.

First, upon input of $2^S$ (S=01, 2, . . . ) P-SCH signals per chip, each containing an I-channel component and a Q-channel component, RX_I and RX_Q, a decimator 311 selects $2^M$ (M<S) P-SCH signals among them and outputs the selected P-SCH signals in parallel to correlators 313, 315, 317, 319. The number of the correlators 313, 315, 317, 319 is $2^M \times 2$ because each of the $2^M$ P-SCH signals is separated into an I-channel signal and a Q-channel signal.

The correlators 313 and 317 correlate the I-channel signals of the $2^M$ P-SCH signals with a PSC generated from the first-step cell searcher 400. The correlators 315 and 319 correlate the Q-channel signals of the $2^M$ P-SCH signals with the PSC. The correlators 313, 315, 317, 319 are PEGCs (Pruned Efficient Golay Correlators) that correlate input I-channel and Q-channel signals every chip.

The correlators 313 and 315 feed the correlations of the I-channel and Q-channel signals, I1 and Q1, of the first P-SCH signal to an energy calculator 321. In the same manner, the correlators 317 and 319 feed the correlations of the I-channel and Q-channel signals, $I2^M$ and $Q2^M$, of the $2^M$th P-SCH signal to an energy calculator 323.

The energy calculator 321 calculates the correlation energy of the first P-SCH signal by squaring each of its correlations I1 and Q1 and summing the squares. The energy calculator 323 calculates the correlation energy of the $2^M$th P-SCH signal by squaring each of its correlations $I2^M$ and $Q2^M$ and summing the squares.

A parallel-to-serial converter (PSC) 325 serially converts the correlation energies received in parallel from the energy calculators 321 and 323. Here, correlation energies are input to the PSC 325 at every $T_c/2^M$ intervals. An accumulator 327 accumulates the correlation energies received from the PSC 325 for corresponding hypothesis points a predetermined number of times.

A peak detector 329 detects K1 peak accumulated correlation energies equal to or higher than a first threshold among $2560 \times 2^M$ accumulated correlation energies for the hypotheses. A controller (not shown) compares the K1 accumulated correlation energies with a second threshold. If there is at least one accumulated correlation energy equal to or higher than the second threshold, the controller transitions to the second cell search, considering that the first cell search step is completed. On the other hand, if the K1 accumulated correlation energies are lower than the second threshold, the first cell search step is repeated. The reason for detecting the K1 peak accumulated correlation energies equal to or higher than the first threshold instead of the highest accumulated correlation energy is that the first-step cell searcher 400 is used for neighbor cell search as well as for initial acquisition. That is, during a neighbor cell search, the first-step cell searcher 400 detects a plurality of peak accumulated correlation energies equal to or higher than a predetermined value to search for a neighbor cell to which a handoff is likely to occur. Therefore, the controller controls the peak detector 329 to detect the highest accumulated correlation energy during initial acquisition, and to detect the K1 peak accumulated correlation energies equal to or higher than the first threshold during neighbor cell search.

Upon completion of the first cell search step, the first counter 300 in the timing controller 600 illustrated in FIG. 3 is set to a slot boundary timing corresponding to the highest accumulated correlation energy, for example, α, and feeds the slot boundary timing value as a start timing to the second-step cell searcher 500. The start timing is a slot boundary timing with which the second-step cell searcher 500 commences the second cell search step.

Figure 5:
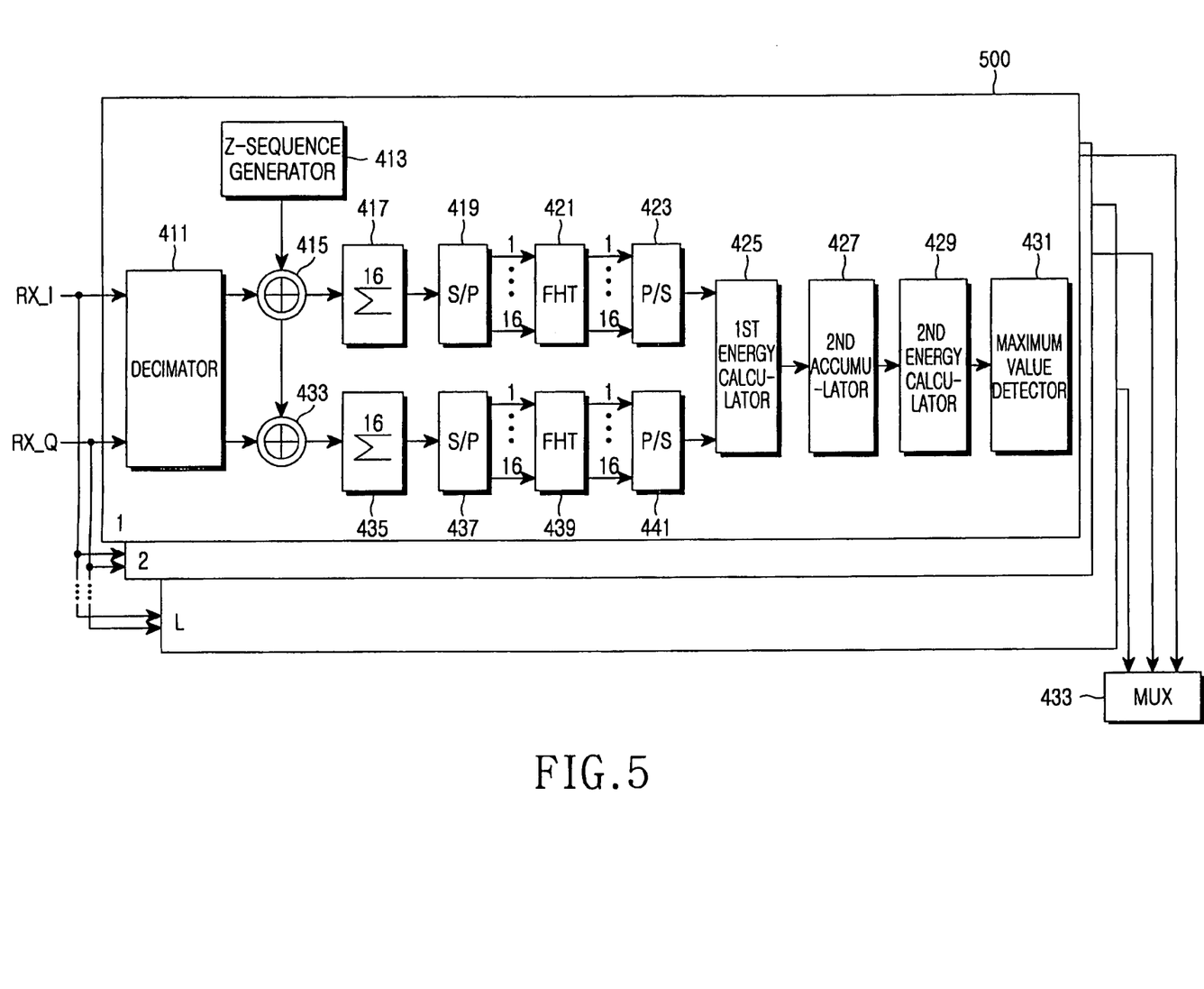
FIG. 5 is a block diagram of a second-step cell searcher illustrated in FIG. 3.

FIG. 5 is a block diagram of the second-step cell searcher 500 illustrated in FIG. 3. With each slot boundary timing acquired in the first cell search step, the second-step cell searcher 500 correlates an S-SCH signal with 16 SSCs generated in the UE and then correlates the S-SCH signal with 64 code groups and 15 frame boundary hypotheses. The second-step cell searcher 500 detects a plurality of code groups and frame boundary timings having correlations equal to or higher than a threshold. When the second cell search step is used for initial acquisition, the second-step cell searcher 500 controls only one code group and one frame boundary timing having the highest correlation to be used in the third cell search step. When the second cell search step is used for neighbor cell search, the second-step cell searcher 500 controls code groups and frame boundary timings having correlations equal to or higher than the threshold to be used in the third cell search step.

Referring to FIG. 5, a plurality of, for example, L second-step cell searchers 500 are used for high-speed cell search. They are common in structure and thus the first second-step cell searcher 500 will be described by way of example. Synchronized to a slot boundary timing found in the first cell search step, a decimator 411 receives $2^S$ (S=0, 1, 2, . . . ) S-SCH signals per chip, each containing an I-channel signal and a Q-channel signal and outputs an I-channel signal and a Q-channel signal of a particular sample at the slot boundary timing to despreaders 415 and 433, respectively.

The despreaders 415 and 433 despread the I-channel signal and the Q-channel signal with a Z sequence generated in a Z-sequence generator 413. The Z sequence is the same as used to spread the P-SCH signal in a transmitter.

First accumulators 417 and 435 respectively accumulate the despread I-channel and Q-channel signals a predetermined number of times, that is, 16 times because the S-SCH signal uses one of 16 SSCs in each slot. SPCs (Serial-to-Parallel Converters) 419 and 437 output 16-times accumulated I-channel and Q-channel signals in parallel.

FHTs (Fast Hadamard Transformers) 421 and 439 performs fast-Hadamard transformation on the parallel signals received from the SPCs 419 and 437, respectively, and output correlations between 256 chips of the P-SCH signal and the 16 SSCs. PSCs 423 and 441 serially output parallel correlation values received from the FHTs 421 and 439.

A first energy calculator 425 squares the correlations received from the PSCs 423 and 441 and adds them. A second accumulator 427 accumulates the correlation energies received from the first energy calculator 425 a predetermined number of times in order to obtain accumulated correlation energies of the S-SCH signal in corresponding slots with respect to the SSCs. The reason for accumulating the correlation energies the predetermined number of times is to improve search performance in case of a low $E_c/I_o$ of the S-SCH signal. Then the second accumulator 427 outputs 15×16 accumulated correlation energies to a second energy calculator 429.

Figure 6B:
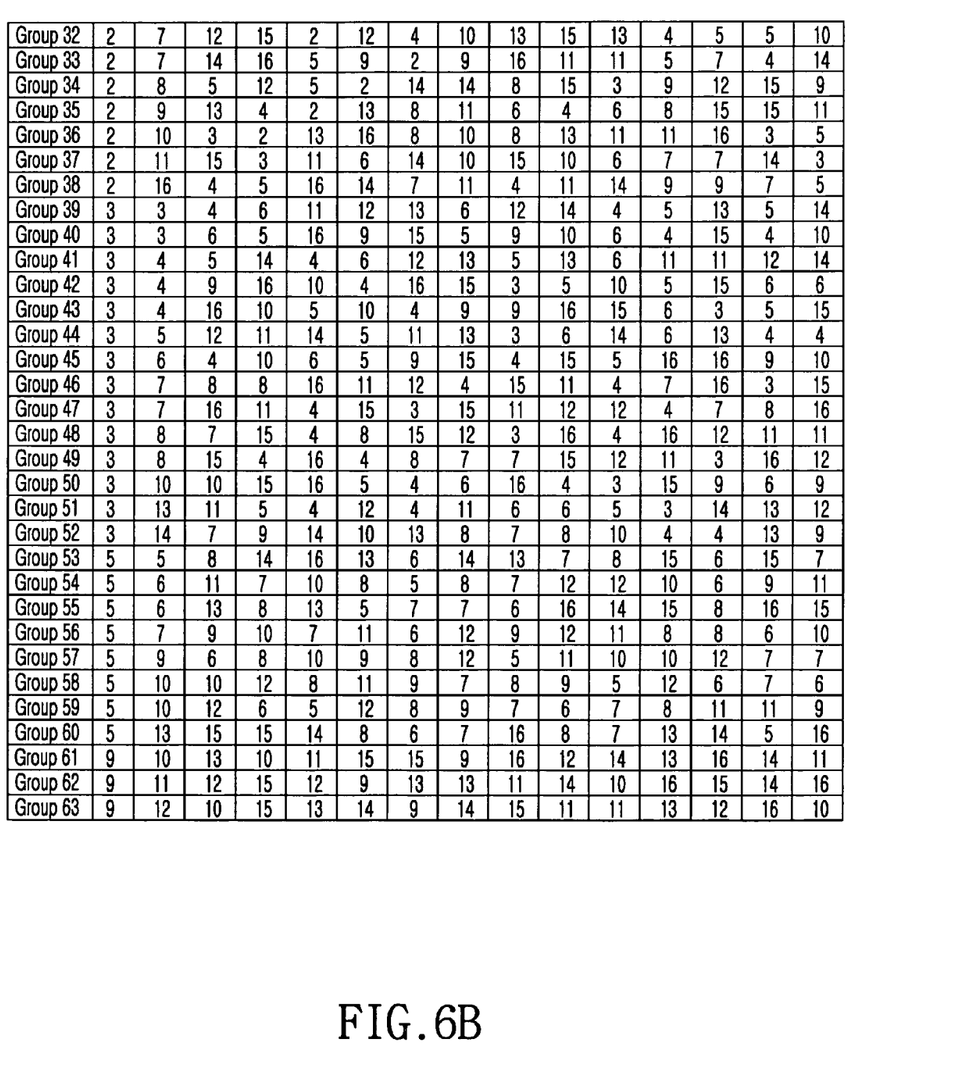

The second energy calculator 429 compares the 15×16 accumulated correlation energies with SSC assignment tables illustrated in FIGS. 6A and 6B and accumulates correlations between each of the 15 frame boundary hypotheses and corresponding 64 SSCs in 64 code groups 15 times. Thus, the second energy calculator 429 outputs 15×64 accumulated correlation energies. The maximum value detector 431 detects a predetermined number of, for example, K2 correlation energies having the highest values among the 15×64 accumulated correlation energies and outputs the detected K2 correlation energies to a multiplexer (MUX) 433.

The other second-step cell searchers, that is, the second to Lth second-step cell searchers each output K2 correlation energies to the MUX 433. The MUX 433 multiplexes the received correlation energy values. Then, a controller (not shown) compares the highest correlation energy values received from the MUX 433 with a threshold one by one. If at least one highest correlation energy value is equal to or higher than the threshold, the controller transitions to the third-step cell search, and otherwise, it repeats the first-step cell search.

The reason for detecting the K2 highest correlation energy values instead of one highest correlation energy is to detect neighbor cells common in slot boundary timing during a neighbor cell search. In the case of initial acquisition, the maximum value detector 431 detects one highest correlation energy value. The decimator 411 to the second accumulator 427 in the second-step cell searcher 500 operate for 256 chips from each slot boundary in order to reduce power consumption, that is, increase the waiting time of the UE.

FIGS. 6A and 6B illustrate SSC assignment tables in UMTS. FIG. 6A illustrates 32 scrambling code groups #0 to #31 and FIG. 6B illustrates the other 32 scrambling code groups #32 to #63. For example, if there are 960 Node Bs in the UMTS system, they are classified into 64 groups, each having a scrambling code as illustrated in FIGS. 6A and 6B. Needless to say, when the number of Node Bs in the UMTS system and the number of Node Bs in each group are changed, the scrambling code groups may be changed. A scrambling code assigned to each scrambling code group is generated using 15 SSCs among 16 SSCs #1 to #16. The reason for selecting 15 SSCs is that a scrambling code is assigned on a frame basis and one frame includes 15 slots. Searching the S-SCH using the SSC assignment tables facilitates detection of a scrambling code group and a frame boundary timing.

After the second cell search step is completed, the second counter 350 in the timing controller 600 illustrated in FIG. 3 is set to the index of a detected frame boundary timing, for example, β. Thus, the index of the slot boundary timing, α set in the first counter 300 as detected in the first cell search step and the index of the frame boundary timing, β set in the second counter 350 as detected in the second cell search step are given as start timing for the third cell search step.

Figure 7:
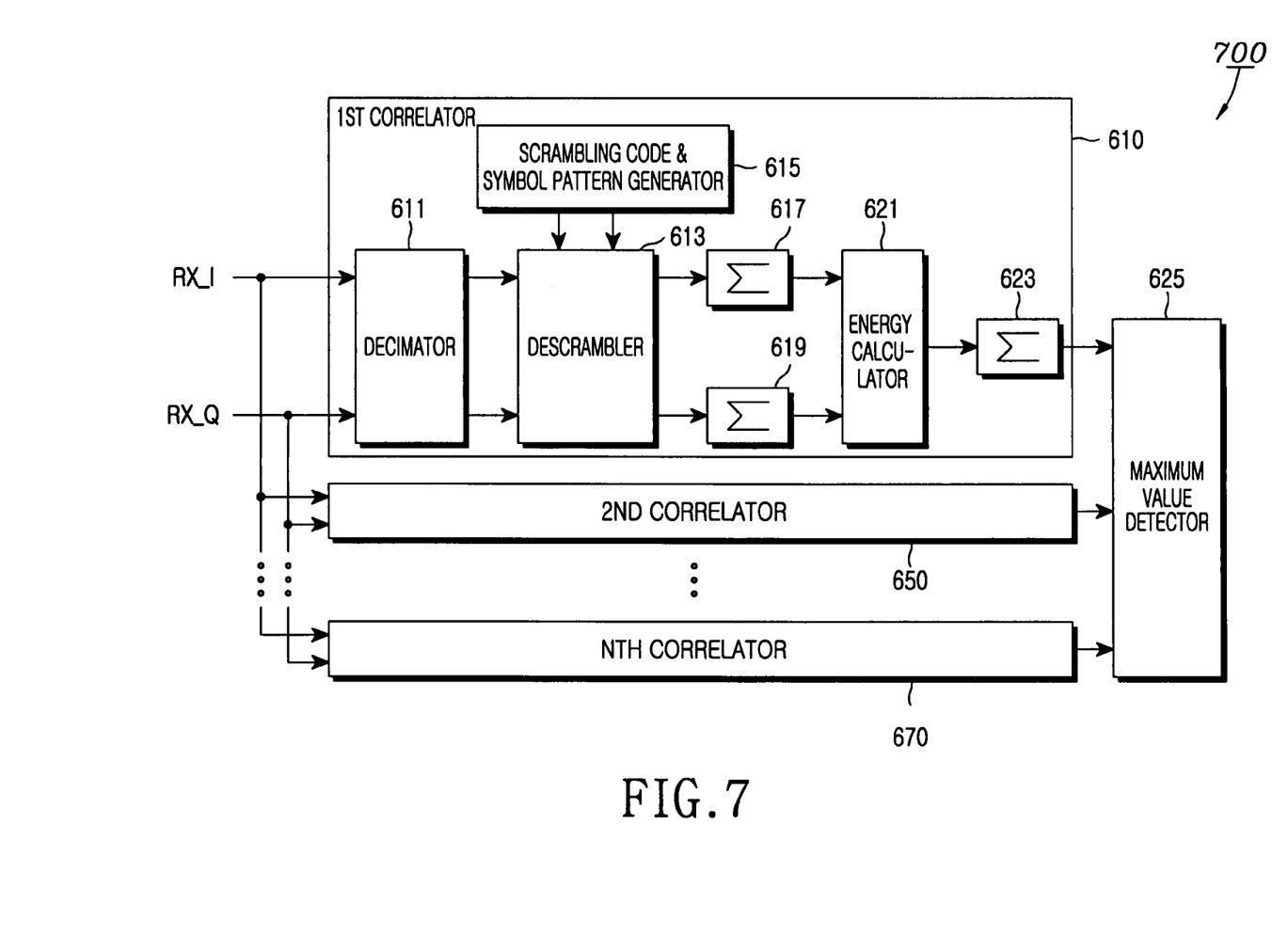
FIG. 7 is a block diagram of a third-step cell searcher illustrated in FIG. 3.

FIG. 7 is a block diagram of the third-step cell searcher 700 illustrated in FIG. 3. Referring to FIG. 7, the third-step cell searcher 700 correlates a CPICH signal with 8 scrambling codes in the scrambling code group detected in the second cell search step and selects correlations equal to or higher than a threshold, to thereby acquire the scrambling code number of the covering Node B or determine whether a handoff is to occur. In the case of initial acquisition, the third-step cell searcher 700 uses a scrambling code group and a frame boundary timing, which have the highest correlation. In the case of neighbor cell search, the third-step cell searcher 700 uses scrambling codes and frame boundary timings that have correlations equal to or higher than a threshold in order to search for different neighbor cells having the same frame boundary timing.

For high-speed cell search, the third-step cell searcher 700 is provided with a plurality of, that is, N correlators. Since first to Nth correlators 610 to 670 are the same in operation, the first correlator 610 will be described below by way of example.

Upon input of $2^S$ (S=0, 1, 2, ...) CPICH signals per chip, each including an I-channel signal and a Q-channel signal RX_I and RX_Q, a decimator 611 selects a particular sample with a frame boundary timing detected in the second cell search step.

A descrambler 613 descrambles the I-channel and Q-channel signals received from the decimator 611 with a scrambling code and a symbol pattern generated in a scrambling code & symbol pattern generator 615. First accumulators 617 and 619 accumulate the descrambled I-channel and Q-channel signals a predetermined number of times, respectively. An energy calculator 621 squares each of the accumulated I-channel and Q-channel signals and adds them. A second accumulator 623 accumulates correlation energies received from the energy calculator 621 a predetermined number of times.

The N correlators detect correlation energies and feed them to a maximum value detector 625. The maximum value detector 625 selects a plurality of, for example, K3 highest correlation energy values. Then a controller (not shown) compares the K3 correlation energy values with a threshold. If there is at least one correlation energy value equal to or higher than the threshold, the controller ends the third cell search step, considering that the third cell search step is successful. On the other hand, if the K3 correlation energies are lower than the threshold, the controller transitions to the first cell search step, determining that the third cell search step is a failure.

Figure 8:
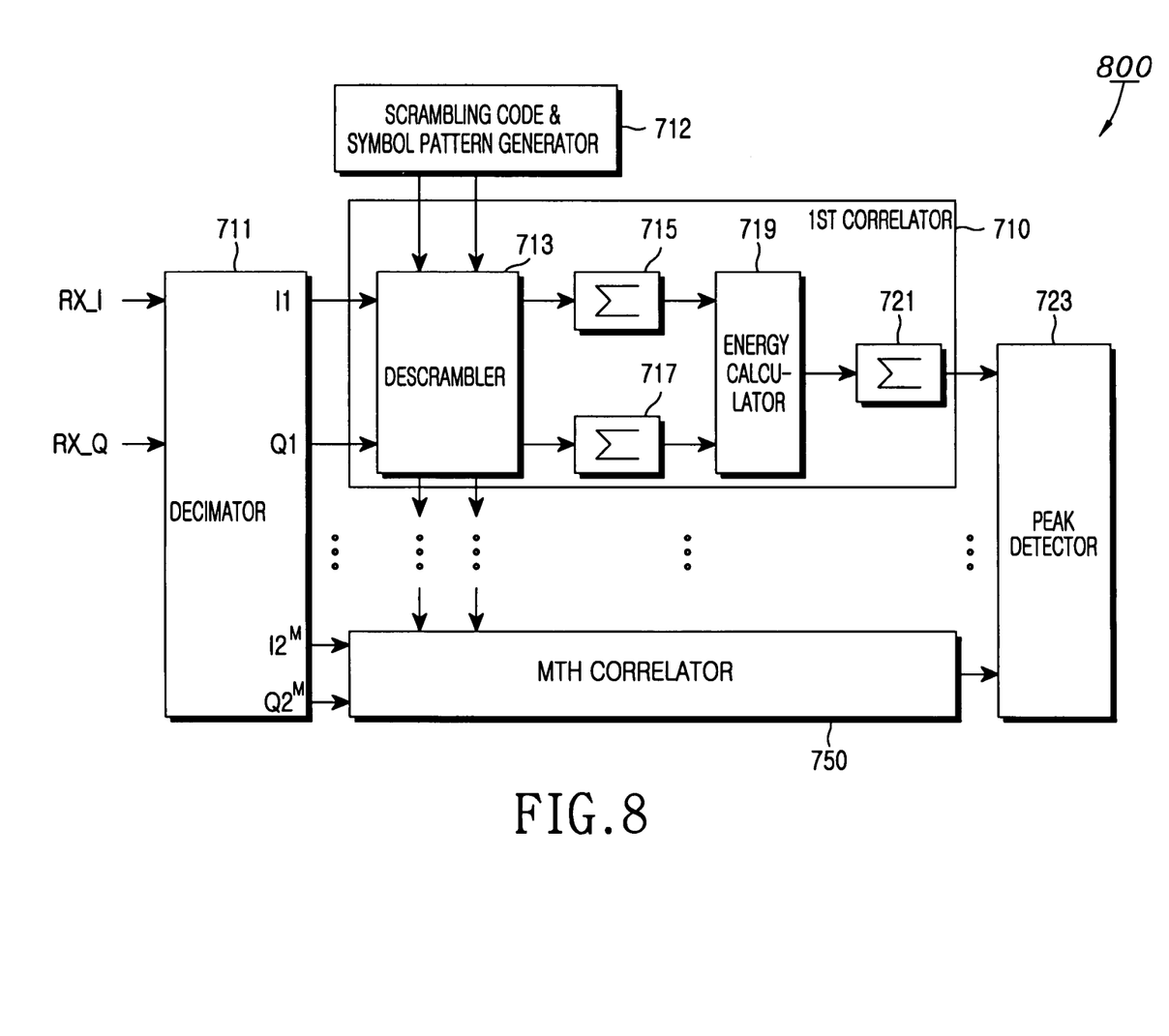
FIG. 8 is a block diagram of a multi-path searcher illustrated in FIG. 3.

Referring to FIG. 8, the multi-path searcher 800 correlates a CPICH signal with hypotheses at predetermined intervals in a scrambling code timing window and detects scrambling code timings having peak correlations equal to or higher than a threshold. Here, the scrambling code timing found in the third-step cell searcher 700 is given as start timing for the multi-path searcher 800.

Upon input of $2^S$ (S=0, 1, 2, ...) CPICH signals per chip, each including an I-channel signal and a Q-channel signal RX_I and RX_Q, a decimator 711 selects $2^M$ (M<S) CPICH signals at predetermined intervals and feeds them to a plurality of, that is, M correlators 710 to 750. Since the M correlators 710 to 750 are the same in structure, the first correlator 710 will be described below by way of example.

A descrambler 713 descrambles the I-channel and Q-channel signals received from the decimator 711 with a scrambling code and a symbol pattern generated in a scrambling code & symbol pattern generator 712. First accumulators 715 and 717 accumulate the descrambled I-channel and Q-channel signals a predetermined number of times, respectively. An energy calculator 719 squares each of the accumulated I-channel and Q-channel signals and adds them. A second accumulator 721 accumulates correlation energies received from the energy calculator 719 a predetermined number of times.

The M correlators detect correlation energies and feed them to a peak detector 723. After a hypothesis test is completed for $2^M$ hypotheses spaced by $T_c/2^M$, the next $2^M$ hypotheses are tested. Upon completion of a hypothesis test on all hypotheses within the search window, the peak detector 723 selects a plurality of, for example, K4 highest peak correlation energy values. Then a controller (not shown) compares the K4 correlation energy values with a threshold. If at least one correlation energy value is equal to or higher than the threshold, the controller ends the multi-path search, considering that the multi-path search is successful. On the other hand, if the K4 correlation energies are lower than the threshold, the controller repeats the multi-path search, determining that the multi-path search is a failure.

The reason for selecting the K4 correlation energy values in the peak detector 713 is that a signal is received from multiple paths.

The timing controller 600 illustrated in FIG. 3 will be described. The timing controller 600 provides a timing reference within the cell search apparatus to support active search timing transition between the four searchers 400, 500, 700, 800. Each time a hypothetical timing shifts, the first counter 300 in the timing controller 600 increases its count by one in a range of 0 to 2560×(the number of hypotheses per chip)−1. The second counter 350 increases its counter by one in a range of 0 to 14 each time the first counter 300 is reset. That is, the first counter 300 is finally set to a slot boundary timing index found in the first cell search step, and the second counter 350 is finally set to a frame boundary timing index found in the second cell search step.

Accordingly, the searchers 400, 500, 700, 800 start to search when the first counter 300 and the second counter 350 have particular count values, and after the searches are completed, detected timings are set as the counts. As illustrated in FIG. 3, start timing for each searcher is timing detected in the previous search step.

In accordance with the present invention as described above, (1) a UE can perform high-speed multi-path search by searching a scrambling code timing window after initial acquisition instead of using the three-step cell search for the initial acquisition in UMTS; (2) the UE searches adaptively according to the type of information a Node B provides in a neighbor cell search, thereby increasing a neighbor cell search speed; (3) the UE searches a wider scrambling code timing window during reacquisition than during multi-path search. Therefore, the reacquisition is performed fast and the waiting time of the UE is increased; and (4) the cell search apparatus in the UE supports the four search modes, that is, initial cell search, neighbor cell search, multi-path search, and reacquisition in simplified hardware, and controls search transition appropriately by providing a timing reference for the four search modes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A cell search method in a mobile communication system having a plurality of cell searchers for acquiring timing of a cell and a code of the cell and a controller for determining information received from Node B, comprising the steps of:
   determining whether the information includes a code number and timing information; and
   determining timing of multipath signals when the information includes the code number and the timing information, or acquiring the timing of the cell, the code of the cell and determining the timing of the multipath signals when the information does not include a code number and timing information of the cell under the control of the controller.

2. A cell search apparatus in a mobile communication system, comprising:
   a first-step cell searcher for receiving a P-SCH (Primary Synchronization Channel) signal and acquiring slot boundary timing to a Node B from the P-SCH signal;
   a second-step cell searcher for receiving an S-SCH (Secondary Synchronization Channel) signal in synchronization to the slot boundary timing, acquiring frame boundary timing to the Node B from the S-SCH signal, and detecting a scrambling code group to which the Node B belongs;
   a third-step cell searcher for receiving a CPICH (Common Pilot Channel) signal in synchronization to the frame boundary timing, and acquiring a code timing by detecting the scrambling code of the Node B;
   a multi-path searcher for correlating the CPICH signal in a predetermined area with respect to the code timing with the scrambling code and detecting multi-path signals having peak correlation energies equal to or higher than a first threshold; and
   a timing controller for generating indexes of the slot boundary timing and the frame boundary timing and providing the indexes as a timing reference to the searchers when a state transition occurs.

3. The cell search apparatus of claim 2, wherein the first-step cell searcher includes:
   an energy calculator for calculating correlation energies by correlating the P-SCH signal with a PSC (Primary Synchronization Code);
   a peak detector for accumulating the correlation energies a predetermined number of times and detecting a first number of peak correlation energies in a descending order; and
   a controller for, if a first cell search step is used for initial cell search and a highest of a first number of correlation energies received from the peak detector is equal to or higher than a second threshold, transitioning to a second cell search step in synchronization to a slot boundary timing corresponding to the highest correlation, and if the first cell search step is used for neighbor cell search, transitioning to the second cell search step in synchronization to each of slot boundary timings corresponding to correlation energies equal to or higher than the second threshold among the first number of correlation energies.

4. The cell search apparatus of claim 2, wherein the second-step cell searcher includes:
a first accumulator for despreading the S-SCH signal in synchronization to a slot boundary timing corresponding to the slot boundary timing index and accumulating the despread S-SCH signal a first number of times;
a first energy calculator for calculating first correlation energies by correlating the accumulated signal with SSCs (Secondary Synchronization Codes);
a second accumulator for accumulating the first correlation energies a second number of times;
a second energy calculator for calculating second correlation energies by correlating the accumulated first correlation energies with scrambling code groups;
a maximum value detector for detecting a first number of peak second correlation energies in a descending order; and
a controller for, if the second cell search step is used for initial cell search and a highest of a first number of correlation energies received from the maximum value detector is equal to or higher than a second threshold, transitioning to a third cell search step in synchronization to a frame boundary timing corresponding to the highest correlation, and if the second cell search step is used for neighbor cell search, transitioning to the third cell search step in synchronization to each of frame boundary timings corresponding to correlation energies equal to or higher than the second threshold among the first number of correlation energies.

5. The cell search apparatus of claim 2, wherein the third-step cell searcher includes:
a plurality of correlators each having a first accumulator for receiving the CPICH signal in synchronization to the slot boundary timing corresponding to the slot boundary index and the frame boundary timing corresponding to the frame boundary index, descrambling the CPICH signal with a predetermined scrambling code and symbol pattern, and accumulating the descrambled correlations a first number of times, and a second accumulator for calculating correlation energies of the accumulated correlations and accumulating the correlation energies a second number of times;
a maximum number detector for detecting a second number of correlation energies among the correlation energies received from the correlators; and
a controller for, if the third cell search step is used for initial cell search and a highest of a first number of correlation energies received from the maximum value detector is equal to or higher than a second threshold, synchronizing to a code timing corresponding to the highest correlation energy, and if the third cell search step is used for neighbor cell search and a sum of correlation energies for a same scrambling code, equal to or higher than the second threshold among the first number of correlation energies is equal to or higher than a third threshold, determining a code timing corresponding to the scrambling code to be a code timing of a neighbor cell having the scrambling code.

6. The cell search apparatus of claim 2, wherein the multi-path searcher includes:
a plurality of correlators, each having a first accumulator for, if the timing reference is a code timing detected by initial cell search, receiving the CPICH signal for a predetermined time period in synchronization to the code timing, descrambling the CPICH signal with a predetermined scrambling code and symbol pattern, and accumulating descrambled correlations a first number of times, and a second accumulator for calculating correlation energies of the accumulated correlations and accumulating the correlation energies a second number of times;
a peak detector for detecting a first number of peak correlation energies in a descending order among correlation energies received from the correlators; and
a controller for detecting correlation energies equal to or higher than a first threshold among a first number of correlation energies received from the peak detector, and determining code timings corresponding to the detected correlation energies to be code timings of multi-path signals.

7. The cell search apparatus of claim 6, wherein if the multi-path searcher is used for reacquisition and the timing reference is the code timing detected by initial cell search, the controller searches the CPICH signal in a wider area than a predetermined area in synchronization to the code timing.

8. A cell search method in a mobile communication system having a timing controller for controlling a timing reference by providing a slot boundary index, a frame boundary index, and a code timing index, comprising:
first cell searching including receiving a P-SCH (Primary Synchronization Channel) signal and acquiring slot boundary timing to a Node B from the P-SCH signal;
second cell searching including receiving an S-SCH (Secondary Synchronization Channel) signal in synchronization to the slot boundary timing, acquiring frame boundary timing to the Node B from the S-SCH signal, and detecting a scrambling code group to which the Node B belongs;
third cell searching including receiving a CPICH (Common Pilot Channel) signal in synchronization to the frame boundary timing, and acquiring a code timing by detecting a scrambling code of the Node B;
multi-path searching including correlating the CPICH signal in a predetermined first area with respect to the code timing with the scrambling code upon receipt of an index of the code timing for multi-path search from the timing controller under a predetermined control after an initial cell search of first, second and third cell search is completed, and detecting multi-path signals having peak correlation energies equal to or higher than a first threshold; and
reacquisitioning including correlating the CPICH signal in a second area wider than the first predetermined area with the scrambling code upon receipt of the index of the code timing for reacquisition from the timing controller under the predetermined control after the initial cell search is completed, and reacquiring the code timing if a highest correlation energy is equal to or higher than the first threshold.

9. The cell search method of claim 8, wherein the step of receiving a P-SCH signal comprises:
calculating correlation energies by correlating the P-SCH signal with a PSC (Primary Synchronization Code);
accumulating the correlation energies a predetermined number of times and detecting a first number of peak correlation energies in a descending order; and
transitioning to a second cell searching in synchronization to a slot boundary timing corresponding to a highest correlation of a first number of correlation energies if the first cell searching is used for initial cell search and the highest correlation energy is equal to or higher than a second threshold, and transitioning to the second cell searching in synchronization to each of slot boundary timings corresponding to correlation energies equal to or higher than the second threshold among the first number of correlation energies if the first cell searching is used for neighbor cell search.

10. The cell search method of claim 8, wherein the second cell searching comprises:

despreading the S-SCH signal in synchronization to a slot boundary timing corresponding to the slot boundary timing index and accumulating the despread S-SCH signal a first number of times;

calculating first correlation energies by correlating the accumulated signal with SSCs (Secondary Synchronization Codes);

accumulating the first correlation energies a second number of times;

calculating second correlation energies by correlating the accumulated first correlation energies with scrambling code groups;

detecting a first number of peak second correlation energies in a descending order; and transitioning to the third cell searching in synchronization to a frame boundary timing corresponding to a highest correlation of a first number of correlation energies if the second cell searching is used for initial cell search and a highest correlation energy is equal to or higher than a second threshold, and transitioning to the third cell searching in synchronization to each of frame boundary timings corresponding to correlation energies equal to or higher than the second threshold among the first number of correlation energies if the second cell searching is used for neighbor cell search.

11. The cell search method of claim 8, wherein the third cell searching comprises:

receiving the CPICH signal in synchronization to the slot boundary timing corresponding to the slot boundary index and the frame boundary timing corresponding to the frame boundary index, descrambling the CPICH signal with a predetermined scrambling code and symbol pattern, and accumulating the descrambled correlations a first number of times;

calculating correlation energies of the accumulated correlations and accumulating the correlation energies a second number of times;

detecting a second number of correlation energies among the correlation energies received from the correlators; and synchronizing to a code timing corresponding to a highest correlation energy of the first number of correlation energies if the third cell searching is used for initial cell search and a highest correlation energy is equal to or higher than a second threshold, and determining a code timing corresponding to a scrambling code to be the code timing of a neighbor cell having the scrambling code if the third cell searching is used for neighbor cell search and a sum of correlation energies for the same scrambling code, equal to or higher than the second threshold among the first number of correlation energies is equal to or higher than a third threshold.

12. The cell search method of claim 8, wherein the multi-path searching comprises:

receiving the CPICH signal for a predetermined time period in synchronization to a code timing detected by initial cell search if the timing reference is the code timing, descrambling the CPICH signal with a predetermined scrambling code and symbol pattern, and accumulating the descrambled correlations a first number of times;

calculating correlation energies of the accumulated correlations and accumulating the correlation energies a second number of times;

detecting a first number of peak correlation energies in a descending order among the correlation energies accumulated the second number of times; and detecting correlation energies equal to or higher than a first threshold among the first number of correlation energies, and determining code timings corresponding to the detected correlation energies to be a code timings of multi-path signals.

* * * * *